United States Patent [19]

Peterson et al.

[11] 3,854,050

[45] Dec. 10, 1974

[54] HIGH PRECISION FLUOROMETER FOR MEASURING ENZYMATIC SUBSTRATES IN TISSUE

[75] Inventors: John Ivan Peterson, Falls Church, Va.; Walter S. Friauf, Bethesda, Md.; Stephen B. Leighton, Maplewood, N.J.

[73] Assignee: The United States of America as represented by the Assistant Secretary, Health and Scientific Affairs, Department of Health, Education and Welfare, Washington, D.C.

[22] Filed: Sept. 11, 1973

[21] Appl. No.: 396,224

[52] U.S. Cl. ............... 250/429, 250/252, 250/328, 250/432, 250/461
[51] Int. Cl. ............................................. G01t 1/20
[58] Field of Search .......... 250/252, 302, 303, 304, 250/328, 365, 372, 461, 487, 492, 432, 429; 356/39; 23/230 B; 424/7

[56] References Cited
UNITED STATES PATENTS

| | | | |
|---|---|---|---|
| 3,470,373 | 9/1969 | Brewer et al. | 250/362 |
| 3,497,690 | 2/1970 | Wheeless, Jr. et al. | 250/304 |
| 3,763,374 | 10/1973 | Tiffany et al. | 250/432 |

*Primary Examiner*—James W. Lawrence
*Assistant Examiner*—Davis L. Willis

[57] ABSTRACT

Apparatus and method for the High Precision Fluorometric Biochemical Analysis are disclosed. The apparatus subjects a sample and a reference sample to radiation so that the sample being measured fluoresces. The radiation can be selectively directed at the sample or the reference. Radiation is measured by a photomultiplier and the readings are integrated and compared. A number of samples can be tested in the apparatus.

4 Claims, 7 Drawing Figures

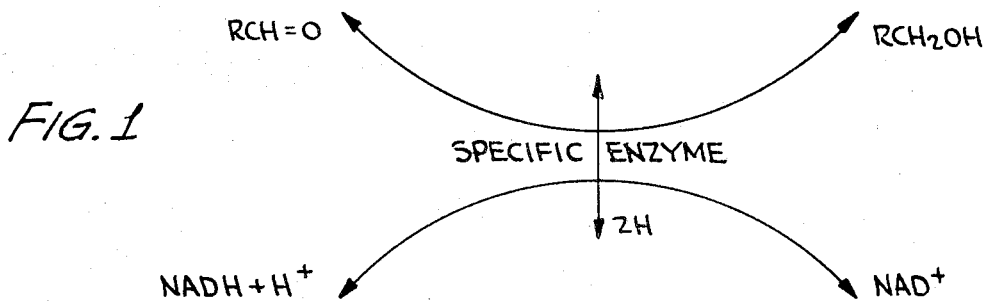
FIG. 1 TYPICAL BIOCHEMICAL REDOX REACTION COUPLED WITH PRODUCTION OR DEPLETION OF FLUORESCENT NADH
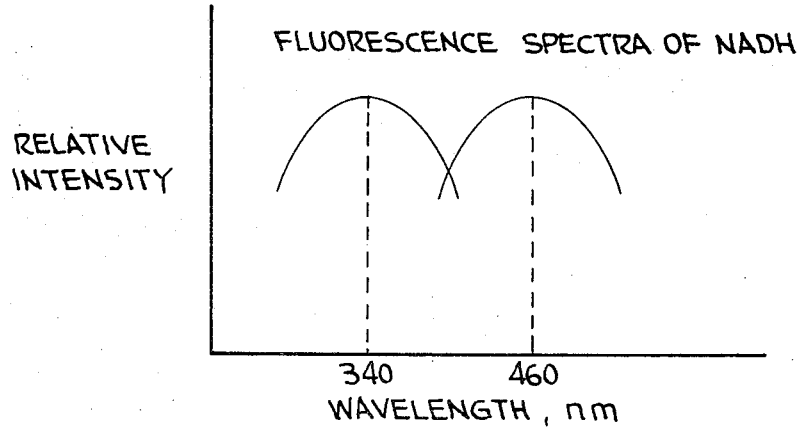
FIG. 2
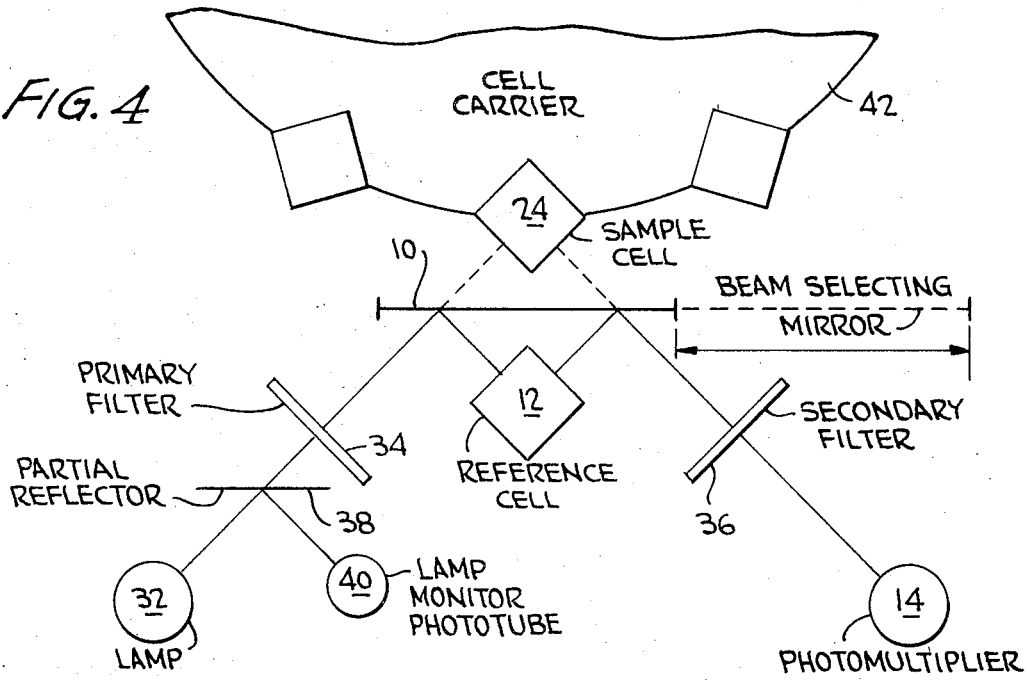
FIG. 4

HIGH PRECISION FLUOROMETER FOR MEASURING ENZYMATIC SUBSTRATES IN TISSUE

BACKGROUND OF THE INVENTION

This invention relates to Fluorometric Biochemical Analysis, and more specifically this invention relates to a High Precision Method and Apparatus for performing fluorometric biochemical analysis.

Studies of cellular metabolism require improved analytical tools for measuring the molecular entities involved in biochemical reactions. These substances ofter exist at relatively low concentrations, and their measurement is obscured by various biochemical interferences which limit analytical sensitivity. One general approach to measurement of many such entities involves their oxidation-reduction coupling with the NAD-NADH (nicotinamide adenine dinucleotide-nicotinamide adenine dinucleotide hydrogen) conversion, as shown schematically in FIG. 1. The production or depletion of NADH in the reaction is observed by the fluorescence change, thus providing an effective analytical device for quantitation of the substrate of interest. Specificity for a particular analyte is obtained by the choice of enzyme used to couple the oxidation-reduction reaction. Other methods of analysis are available, such as optical absorption of NADH, but fluorescence is attrative because of the sensitivity engendered by a relatively high fluorescent intensity of NADH and convenient spectral characteristics, as shown in FIG. 2.

Biochemical measurements based upon NADH fluorescence are commonly used but are limited by the precision of available instrumentation. The difficulty is that tissue samples, for example brain or liver homogenates, have a background fluorescence which essentially matches the spectral characteristics of NADH, with an intensity as much as 100 times the analytical change in NADH. Available commercial fluorometers have been designed to optimize either spectral information or sensitivity for measurement of low level fluorescence. The current need is for an instrument with maximum measurement precision and, thereby, greatest accuracy for the small measured change in fluorescence upon which the analysis is based.

SUMMARY OF THE INVENTION

It is, therefore, a primary object of the invention to provide a high precision fluorometer for biochemical measurements which is free of the foregoing and other such disadvantages.

It is another object of the invention to provide a high precision fluorometer for biochemical measurements that automatically measures fluorescence intensity of a sample, adds enzyme reagent to the sample, and remeasures the fluorescence of the sample.

It is still another object of the present invention to provide a high precision fluorometer for biochemical measurements which automatically processes a plurality of samples.

It is yet another object of the present invention to provide a fluorometer for biochemical measurements which measures changes in sample fluorescence of 1 percent with a precision of about 5 percent.

It is a further object of the present invention to provide a method for high precision fluorometric biochemical measurements which is rapid and simple.

The fluorometer of the present invention automatically measures the fluorescence intensity of liquid samples, adds enzyme reagent to each to generate a change in fluorescence, and remeasures the fluorescence of each sample after an appropriate interval. The change in fluorescence of each sample, which is proportional to the quantity of analytical substrate in the sample, is printed. Each individual fluorescence measurement is made with a precision of $1 \times 10^{-4}$ (relative standard deviation).

According to the present invention, a high precision fluorometer for biochemical measurements is provided comprising a source of a beam of radiant energy, cell means for holding a sample to be measured, means for dispensing reagents into said sample cell means to thereby change the fluorescent characteristics of the sample, reference cell means, means for selectively directing the beam at the sample cell means or the reference cell means, whereby the sample or the reference will be exited by the radiant energy to fluoresce, photomultiplier means for converting fluorescent energy into electrical signals, and means for selectively directing fluorescent energy from the sample cell or the reference cell toward the photomultiplier means. The apparatus also includes means for converting the electrical signals to digital signals, means for integrating the digital signals over a predetermined time interval, means for comparing the signals from the sample cell with the signals from the reference cell, thereby producing the ratio of sample to reference intensity, printout means, and rotatable carrier means for a plurality of sample cells. The carrier means includes temperature control means. Also provided are means for rotating the carrier means to position individual sample cells for dispensing reagents thereinto and excitation by the beam, and control means for selectively rotating the carrier means and directing the beams, and activating the integrating means, comparing the sample and reference signals and printing out the desired information.

BRIEF DESCRIPTION OF THE DRAWINGS

This invention will be better understood and objects other than those set forth above will become apparent when consideration is given to the following detailed descriptions thereof. Such description makes reference to the annexed drawings wherein:

FIG. 1 shows schematically the oxidation-reduction coupling of the NAD-NADH conversion;

FIG. 2 indicates the spectral characteristics of NADH:

FIG. 4 is a schematic diagram of the optical system of the apparatus of the instant invention;

DESCRIPTION OF THE PREFERRED EMBODIMENT

Figure 3:
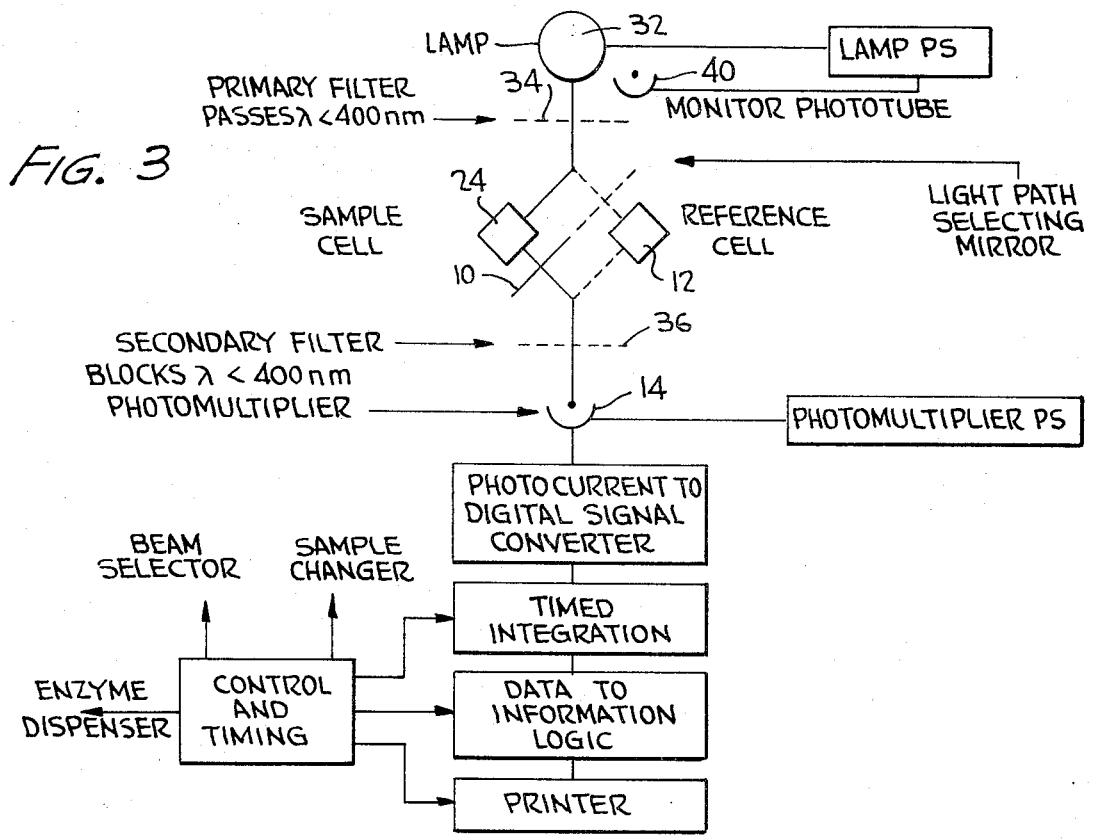
FIG. 3 is a schematic diagram of the apparatus of the instant invention.

The general NAD-NADH reaction has already been discussed with reference to FIG. 1. and the fluorescence characteristics have been discussed with reference to FIG. 2. Attention is now directed to FIG. 3, which is a functional schematic diagram of the apparatus of the instant invention and shows the functional arrangement of the same.

A plurality, preferably twenty separate samples, including standards, are held in a cell carrier. The fluorescence intensity of each is measured and a reagent dispenser then injects enzyme into each one in turn. After elapse of sufficient time for reaction to completion, the fluorescence intensity of each sample is measured again. The two fluorescence values of each sample are stored temporarily, and either the fluorescence intensity or the change in fluorescence associated with each sample are printed, along with sample number.

Other operating modes allow manual control for measurement of intensity or sample changing, and continuous repetitive readings may be made of any selected sample to permit kinetic studies. Test switches are provided for verifying the significant advantage of the use of digital circuitry for signal processing in that there can be no loss of precision in that system; a simple check will show whether it operates correctly. The precision of measurement is determined solely by the parts of the optical system.

Since the interval between comparative measurements may be as long as an hour (although much less in the usual analysis), excellent long-term stability is essential. This is achieved by making the measurements relative to a suitable fluorescent reference. Normally this is a block of uranium glass, but a chemical solution reference can be used in a standard cuvette. Any ratio measuring technique entails either simultaneous parallel measurement processes or sequential use of a single measurement channel. The former requires long-term relative stability of the parallel elements. The latter requires only short-term stability for the time required for one measurement, as well as means for sequencing the sample and standard without impairing accuracy, and provision for storing the first reading. The present invention relies on the second alternative, since its requirements are readily met; the long-term relative stability demand of the first approach is very difficult to achieve.

Data handling requires division, storage, subtraction, and read-out. Digital technics are essential to attain the required accuracy; analog-to-digital conversion is, therefore, also necessary. A-D conversion is implemented with a current-to-frequency ($i$-to-$f$) converter at the base of the photomultiplier tube (PMT) and precisely timed intervals.

Figure 5:
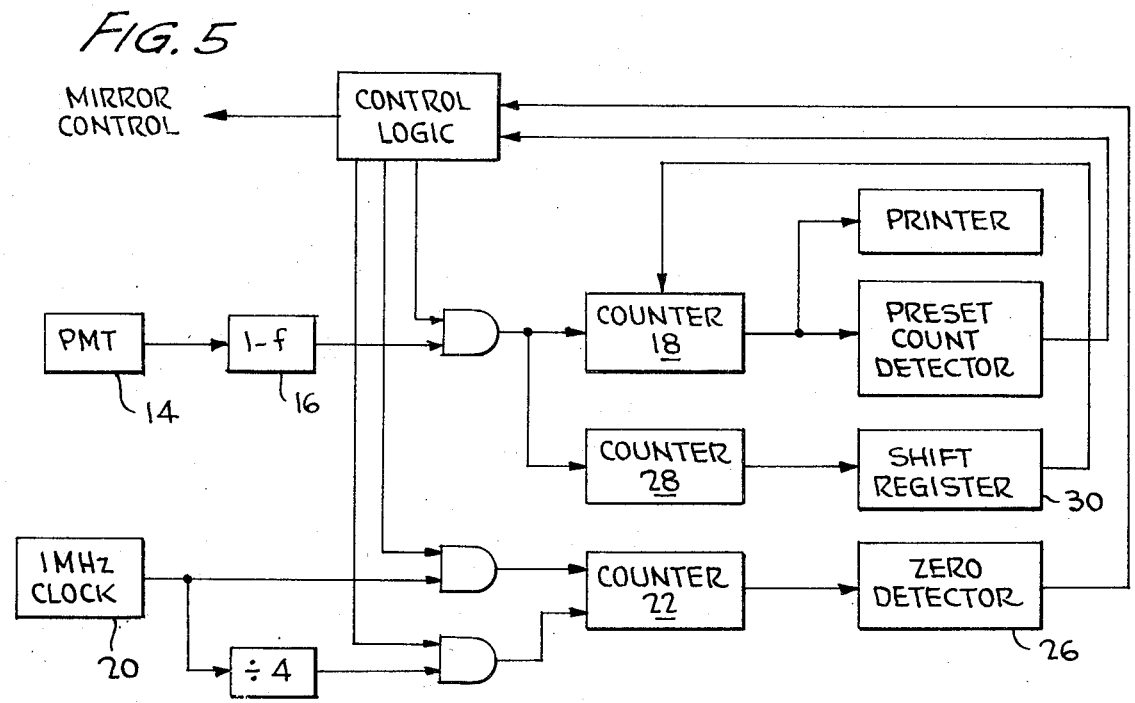
FIG. 5 is a block diagram of the control system of the apparatus of the instant invention.

The data-handling functions could be performed by a minicomputer or certain calculators, or implemented with special purpose hardware, using medium scale integrated circuit elements. The latter option results in a unit which is simpler to operate and less expensive since interfacing and software costs are obviated. Data handling is performed by counters and a MOS static shift register for storage, as shown in FIG. 5. The operation is similar to the dual slope technic employed in many digital voltmeters, except that it is all digital and the sequence is modified to facilitate subtraction when desired. A schematic of the logic system is shown in FIG. 5.

At the start of a measurement, the mirror 10 is positioned so that fluorescent light from the reference 12 reaches the PMT. PUlses from the $i$-to-$f$ converter 16 are accumulated by counter 18 until a preset number is attained. The time required is measured by 1 mhz crystal clock 20 gated to counter 22, for the same time interval $T_1$.

The counter gates are then closed; counter 18 is reset to zero, and the mirror 10 moved to direct fluoroescence from the sample 24 to the PMT 14. When this is complete, a 250 khz signal is gated to counter 22 to count back to zero. The countdown interval, $T_2$, is terminated by a zero detector 26 when it is exactly four times as long as $T_1$. During $T_2$, pulses from the $i$-to-$f$ converter 16 are again accumulated by counters 18 and 28, to given the final reading. The mirror 10 is then closed, to prevent unnecessary bleaching of the sample. The number in counter 18 is printed with the cuvette number; that in counter 28 which is the same as the number in counter 18, is entered in the shift register 30 memory. The sample turret is then advanced one position if the operating mode calls for it, and the shift register is advanced one reading.

After the first cycle of 20 measurements is complete, a second cycle can be made with differences from the first cycle readings printed out. At this point, the first value loaded into the shift register 30 has been shifted all the way through and appears at the output. Prior to $T_2$ of the next reading, the negative of this first value is loaded into counter 18, rather than resetting counter 18 to zero, so the final reading is the difference. Counter 18 is an up/down counter reading sign and absolute value rather than complementary codes for negative numbers, for ease of interpretation. Counter 28 continues to read the full value of the current measurement. This reading is entered into the shift register 30 so that any number of cycles giving the difference between successive cycles can be made.

The mirror used for switching from reference to sample also excludes unnecessary illumination from the sample. Integrating the fluorescent light avoids unnecessary illumination during the settling time which would be required if a filter with a long time constant were used.

An EMI 9781B photomultiplier tube with an S4 spectral response is used. An active filter with a very long time constant in the high voltage supply provides the needed extreme short-term regulation. An $i$-to-$f$ converter, utilizing the 1 mhz clock 20 to time the charge transfer intervals, provides excellent linearity and short-term stability. Wide dynamic range is obtained by using a Teflon integrating capacitor, ultra-low leakage Fairchild FJT–1000 diodes for current switching and transient protection, and a MOSFET input stage. The achievement of some very stringent specifications was greatly simplified by the absence of long-term gain stability requirements, because of the ratio technique described above.

Photon counting is the most attractive of the several alternative approaches considered. It permits direct interface with the data processing system, eliminates the need for a high precision $i$-to-$f$ converter, and relaxes the very stringent short-term requirements on the PMT high voltage supply. The main objection is the short time resolution required of the PMT and counter to achieve high accuracy in a reasonable time. Measurement to one part in $10^4$ requires counting at least $10^8$ photons. To make this measurement within several seconds calls for resolution on the order of a nanosecond, considering that photon arrivals are not uniformly spaced in time, and very few can be missed. While perhaps feasible, such constraints severely restrict the choice of sensors and appear to introduce more difficulties than advantages.

Shot noise amplification is effective only at light levels much below those used with this instrument. Most of the benefits of modulation, or light chopping techniques, are realized by the method employed, which, in effect, chops once for each measurement, thus avoiding the inaccuracy associated with multiple chopping.

Shifting the signal spectrum in the frequency domain by modulation is of little value with photomultipliers because of the virtual absence of $1/f$ noise.

The principal sources of error in this type of instrument are:
1. Temperature variation of reference and sample.
2. Short-term fluctuations in system gain during both reference and sample measurement intervals.
3. Statistical character of the emission, which causes a fractional error inversely proportional to the square root of the number of flouresced photons measured, for both the reference and sample.
4. Rate of long-term drift and the time of a complete measurement which generates errors proportional to the product of drift rate and measurement time.

The temperature problem is discussed elsewhere. Calculations indicate the heating from the illumination needed to keep error 3 well within specification is negligible.

To use an absolute minimum of sample illumination, which is one of the objectives, most of the total error should be allocated to error 3 for the sample. Optimization of design parameters to minimize all other error components involves a compromise which depends on the magnitude of the short-term fluctuations and the rate of long-term drift. Clearly, error 2 is inversely proportional to the square root of the measurement interval, while error 4 is directly proportional to the interval; error 3 is independent of it if illumination intensity is varied inversely with time so as to maintain the total illumination constant at the value just meeting requirement 3. Other parameters under design control are the relative intensity of sample and reference fluorescence, and the apportioning of the total time between sample and reference measurements. The instant apparatus uses a reference fluorescence about 8 times as strong as the typical sample interval. This results in lower statistical error for the reference than for the sample, without significant increase in error 4. Limitations on how far one can go in this direction are set by the dynamic range of the PMT/$i$-to-$f$ converter combination and by the increase in error 2 for the reference measurement as its time is decreased.

A simple optical system is used, since neither fine spectral distinction nor high sensitivity is required, the emphasis being rather on simplicity and stability. FIG. 4 shows the optical layout. A 4-watt tubular fluorescent lamp 32 (General Electric F4T4-BL) is used as the light source because of its efficiency in producing the desired excitation spectrum. The excitation light beam is confined to wavelengths below approximately 400 nm by a Wratten No. 18A filter 34 (Eastman Kodak Co.). Because this filter passes infrared radiation, a Kodak infrared blocking filter was initially included to reject it, but was later found to be unnecessary. The absorption spectrum of NADH corresponds approximately to the emission of this lamp-filter combination. Fluorescence emission of a sample peaks between 460 to 480 nm, so the primary filter described is adequate for separation. The secondary filter 36, located in front of the photomultiplier 14, is a Schott KV 480 low fluorescing filter (Schott Optical Glass, Inc.), absorbing wavelengths below approximately 400 nm, so the photomultiplier sees only the fluorescent emitted light from the sample.

Figure 6:
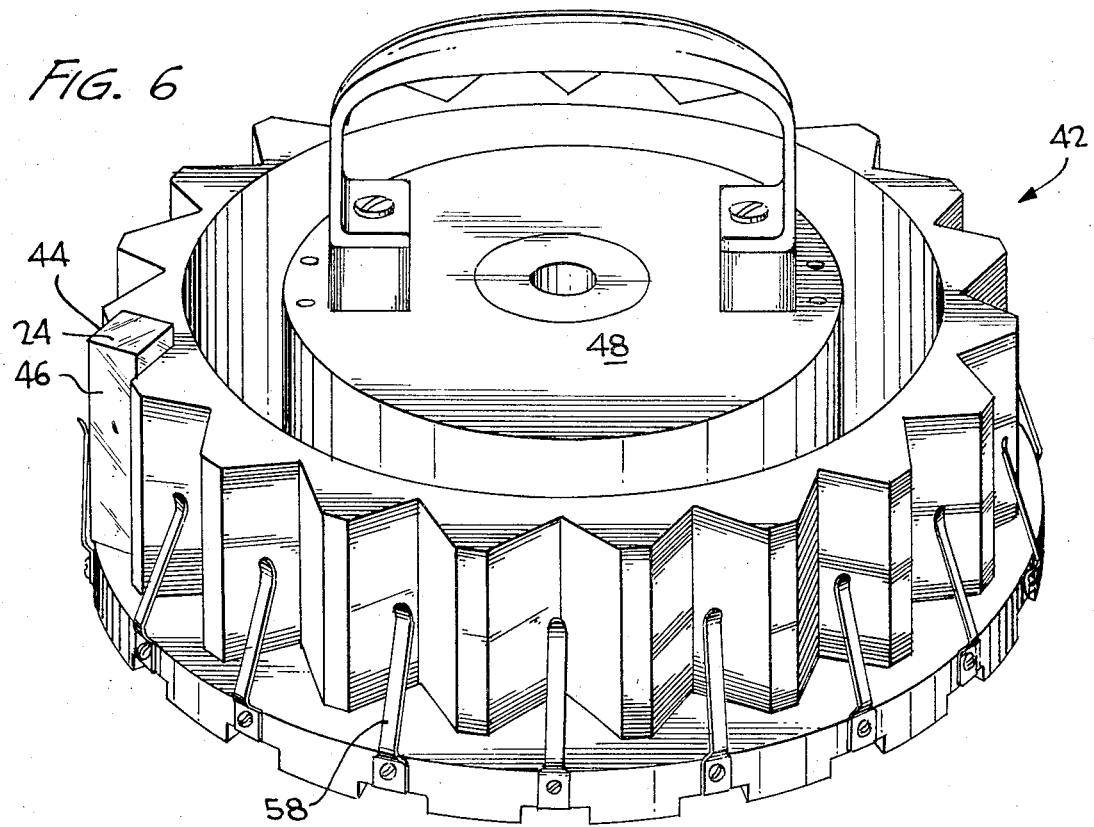
FIG. 6 is a perspective view of the cell carrier used in the apparatus of the instant invention.

No optical directing components other than a beam selecting mirror 10 are necessary, because a sufficiently high level of fluorescence in the sample combined with high photomultiplier sensitivity, provides sufficient intensity to achieve the desired statistical level of photon collection, regardless of large optical losses. A clear, 1-mm-thick quartz plate 38 is arranged to reflect a portion of the excitation beam to a phototube 40 for feedback stabilization of the lamp intensity. The sample cells are the standard 10-mm-path square type, held in a 20-position carrier 42 (FIG. 6). The light path involves two adjacent sides 44 and 46 of the cell 24 at 90°. This is the best choice of beam arrangement to optimize sample excitation and observation, since the samples do not show noticeable surface concentration of fluorescence and may have some turbidity. A holder for a single reference cell 12 is positioned in conjunction with a sliding mirror 10 so the sample cell and the reference cell are alternately in the light path. The reference may be a block of fluorescent glass (Corning color filter glass No. 3750) with appropriate attenuating filters attached. Alternately, a chemical sample amy be used as the reference to provide compensation for any chemical drift which may occur.

It is important to mask the light path so the upper part of the sample cell, where the liquid meniscus occurs, is out of the light path. The precision of measurement is seriously deteriorated by a disturbance of the meniscus if this is not done.

The optical system is contained in an aluminum block 48, split horizontally for ease of assembly of components, with channels for the light path. It contains a circulation path for water for temperature stabilization. The optical block is located at the front of the instrument, with the lamp at the left, the lamp monitor next to it, the reference cell position in the center, and the photomultiplier on the right. The photomultiplier is surrounded by a mu metal shield, except for a window cutout.

Figure 7:
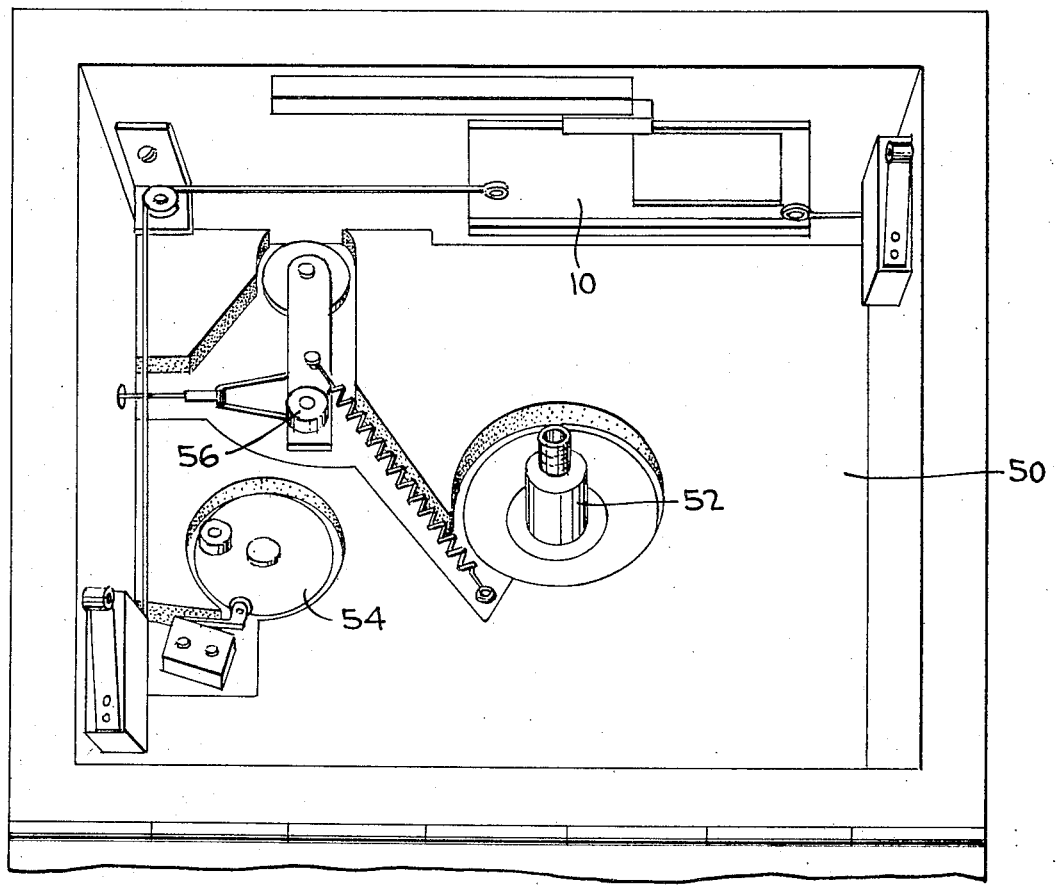
FIG. 7 is a perspective view showing the inside of the cell compartment of the apparatus of the instant invention.

FIG. 7 shows a view inside the cell compartment 50. The cell carrier 42 mounts on a ball bearing supported spindle 52 in the center. The carrier mates with a 45° conical section on the spindle and is tightened with a wind nut. To the right of the spindle is a motor-driven wheel 54 and offset bearing which engages in slots in the bottom of the carrier to form a geneva mechanism for moving the carrier in steps. A microswitch senses the completion of each cycle to stop the motor; a detent 56 consisting of a roller bearing on a spring loaded arm, fits into depressions on the carrier base to provide precise positioning of each cell. The detent spring force moves any play in the carrier spindle. The carrier itself is constructed of aluminum, black anodized, and has a concentric channel for water circulation. A leaf spring 58 on the carrier perimeter at each cell position holds the cells with two of their sides in flat contact with the carrier, to enhance temperature control of the cell.

The sliding mirror 10 (shown in the upper part of FIG. 7) is the only other moving part of the optical system; its positioning must be precisely reproducible. The closed, or reference, position reflects the excitation light into the reference and reflects the fluoresced light from the reference toward the photomultiplier. When the mirror is opened, light passes through apertures in the sliding plate to expose a sample in the carrier, while avoiding exposure of the reference to excitation. An aluminized glass first surface mirror is cemented to a stainless steel plate with cylindrical bars at top and bottom which slide in V grooves of Rulon A. The top groove is under spring pressure. Stops provide precise lateral positioning. The mirror is opened by a torsion motor (Bodine model 740, capacitor, nonsynchronous, high slip, 17 RPM, 53 oz. in., type K instrument gear motor) winding up a radio type dial cord (braided nylon with a fiberglass core) on an 1/8-inch diameter shaft. The cord is attached to one end of the mirror mounting; the mirror is closed by a return spring attached to the other end.

The wells of the instrument are of one-inch-thick Benelex, to provide sturdiness, with a 1/16-inch steel outer surface to improve magnetic shielding of the photomultiplier from fields of wiring and motors. Two-inch-thick polypropylene foam thermal insulation surrounds the exterior. The floor of the cell compartment is nsulated with a ½-inch thick of cork, which may be lifted for cleaning. The mirror motor is on the right side of the cabinet; the geneva drive motor is below the cell compartment.

Temperature stabilization of the cell carrier and optical system is crucial. It was found to be the most important factor in achieving precision of measurement and the most difficult one to control. The change of fluorescence intensity of NADH with temperature was observed to be 1.9 percent per degree C in the range of 10° to 40°C. Therefore, to maintain sample fluorescence within a relative variation of about $1 \times 10^4$, sample temperature must be regulated within 0.003°C. Regulation of lamp temperature is also important to its stability. It was difficult to maintain all parts of the optical and sample system at a precisely controlled temperature with a circulating water system. Gradients of an appreciable fraction of a degree from one place to another could not be eliminated, nor could long-term drifts of temperature be controlled. The solution to achieving the requisite temperature control was found to be a system in which water is circulated in series through the optical block and then through the channel in the cell carrier. In this way the heat of the lamp was removed from the system, the lamp temperature stabilized, and the temperature of the cell carrier stabilized against gradients across it resulting from variations in the temperature of the cabinet wall. As a result, the variation of sample fluorescence caused by temperature drift was reduced to an undetectable level, since any drift in the temperature of the circulating system affected the reference cell and the sample cells equally. Although the temperatures of the reference cell and the sample cell are not exactly the same, the difference between them is constant to the requisite degree, as shown by a test of the system using fluorescent glass blocks. These had about the same charge of fluorescence with temperature as quoted for NADH, and presumably the same as the sample background.

Temperature-controlled water was circulated by a Haake Model FT unit having a suction feature used to return water from the channel in the cell carrier. A return tube in the cover of the instrument is adjusted to the proper height so that the water in the channel is removed by suction when it reaches the proper level. Water flows into the channel through a connection in the cover of the instrument. A microswitch interlock is provided to stop the circulating pump when the cover is lifted, to prevent flooding; it also connects to the mirror control to keep it from opening and exposing the photomultiplier tube to exterior light.

In the initial stages of testing the instrument, it became apparent that an automatic reagent addition and stirring device was required to obtain the desired precision of sample measurement. Manually carrying out these operations is excessively inconvenient, and it is necessary to thoroughly stir the samples in a manner that minimizes thermal disturbance.

A reagent dispensing assembly consists of a separate unit which mounts over the cover of the instrument. This is a mechanism for dipping a length of stainless steel hypodermic tubing (22 gauge) through the cover of the fluorometer into a cell located at the rear position on the carrier, opposite to the cell located in the optical path. The system is electrically operated and controlled so that the tubing dips into the cell and enzyme is immediately added as soon as the cell moves into position. The tubing vibrates during immersion to stir the contents of the cell and is withdrawn just before the cell moves out of position. Enzyme solution is delivered to this dispensing system through small bore polyethylene tubing from a commercial microsyringe drive unit located near the instrument and controlled by it.

The electronic system, which includes power supplies, controls, and signal processing, may be located in a separate cabinet with cable connections to the optical instrument.

Tests were done to determine the capability of the instrument to make precise measurements of small changes in the fluorescence of samples. These tests were made initially using solutions of a stable fluorescent chemical, quinine, to minimize the problems of sample instability, and subsequently were done with a model enzymatic reaction, the oxidation of fluorescent NADH with pyruvate, to duplicate more reasonably the type of application for which the instrument was designed. Finally, the enzymatic determination of isocitrate in liver homogenate was used as a test. A fluorescent glass reference was used for all tests.

EXAMPLE 1

Quinine Samples (Q)

The instrument was used to measure the fluorescence of a group of cells filled with 4.00 ml of $4 \times 10^{-7}$ g cc$^{-1}$ quinine sulfate in 0.1 N $H_2SO_4$. After the initial measurement, 10.0 microliters of a solution of quinine sulfate was injected into each cell and stirred by the dispenser system and the fluorescence remeasured. The concentration of the quinine in the incremental solution was varied from test to test, resulting in the increase in fluorescence of the samples shown in the table. The precision of the resulting measured change in fluorescence for each test is shown in Table 1. The relative standard deviation of volumetric addition of solution by the dispenser system is not more than 1 percent.

EXAMPLE 2

Pyruvate Reaction (P)

A further test set was based upon the reduction of pyruvate to lactate by NADH, using the enzyme lactic dehydrogenase (LDH), with a resulting decrease in the amount of fluorescent NADH equal to the amount (on a molecular basis) of pyruvate initially present. A large excess of NADH is present, so that when the reaction is initiated by addition of enzyme, the decrease in fluorescence is relatively small. This is similar to the analytical situation for which the instrument is intended. In this case, the precision of dispensing the enzyme has little influence on the fluorescence measurement, since the volume of the solution is changed by only 0.25 percent and the reagent added has little or no fluorescence. Stirring is also less critical because the enzyme concentration is in excess of that required to achieve a complete reaction within a few minutes.

In each test, the cells were filled with 4.00 ml of $5 \times 10^{-5}$ g cc$^{-1}$ of NADH (Beta-DPNH, Sigma D-7380) in 0.1 M phosphate buffer of pH 7.4. The solution also contained pyruvate (pyruvic acid Na, Sigma P-2256) in the amount selected for each test to give the desired change in fluorescence. After initial measurement of the fluorescence of a group of samples in a test, LDH enzyme (lactic dehydrogenase, Sigma L-2500 type II, 7,000 units ml$^{-1}$) was injected into each sample by the dispenser. Additions were 10.0 microliters of the enzyme reagent diluted tenfold with distilled water. The fluorescence of each sample was measured again after completion of the reaction, and the decrease in fluorescence recorded. The results are shown in Table 1.

TABLE I

| Quinine and Pyruvate Sample Precision | | | |
|---|---|---|---|
| Test | Number of samples in test | Mean change in fluorescence, % | Relative standard deviation, as % of mean change in fluorescence |
| | | (increase) | |
| Q1 | 10 | 0.44 | 5.0 |
| Q2 | 10 | 0.44 | 12.5 |
| Q3 | 10 | 1.3 | 4.2 |
| Q4 | 10 | 1.2 | 5.9 |
| Q5 | 9 | 7.5 | 3.4 |
| Q6 | 9 | 7.0 | 5.2 |
| Q7 | 10 | 6.5 | 6.5 |
| | | (decrease) | |
| P1 | 10 | 1.05 | 6.7* |
| P2 | 11 | 1.3 | 10.8* |
| P3 | 8 | 8.5 | 1.1 |
| P4 | 11 | 17.1 | 1.5 |

*In Test P1, special care was taken to eliminate bubbles from the cells, which resulted in better precision than in Test P2.

EXAMPLE 3

Isocitrate Measurement

The oxidation of isocitrate by NADP$^+$ (nicotinamide adenine dinucleotide phosphate) to form α-ketoglutarate and NADPH results in an increase in fluorescence, the fluorescence of NADPH being similar to that of NADH. The samples in this series of tests contained 3.00 ml of $1.7 \times 10^{-5}$ M NADP$^+$ (Boeringer-Mannheim Crop.), and $1 \times 10^{-4}$ M MnCl$_2$ in $3 \times 10^{-3}$ M Tris buffer of pH 7.4. Isocitrate substrate (Sigma, assayed by UV absorption analysis of NADPH) was added to the samples for standardization, in the amounts shown in Table 2. Some samples also contained 0.2 ml of liver homogenate (protein-precipitated with HClO$_4$) representing a ¼ dilution of the original liver. In the case of the samples denoted "treated liver," 1 g of Florisil (100–200 mesh, Floridin Co.) has been mixed with 10 ml of a different liver homogenate and then removed by centrifugation, to decrease the non-specific background fluorescence of the samples. After measurement of the initial fluorescence of the samples, 10.0 microliters of IDH enzyme (isocitrate dehydrogenase, Boeringer-Mannheim Corp., diluted in 50 percent glycerol solution to give 5 micrograms per sample) were added to each by the dispenser and the fluorscence remeasured after a few minutes reaction time. Table 2 summarizes the results in this set of tests.

TABLE 2

| ISOCITRATE TEST RESULTS | | | | | | | | | | | |
|---|---|---|---|---|---|---|---|---|---|---|---|
| Isocitrate added, nmols | Blank solutions, no liver | | | | Florisil-treated liver samples | | | | Untreated liver samples | | | |
| | N | M | RSD% | F | N | M | RSD% | F | N | M | RSD% | F |
| 0 | | * | | | 3 | 1,884 | 1.0 | | 3 | 2,455 | 3.3 | |
| 0.084 | 4 | 447 | 7.0 | | 3 | 1,983 | 0.5 | 118 | 3 | 2,504 | 3.0 | 580 |
| 0.84 | 4 | 1,574 | 3.9 | 149 | 2 | 3,119 | 3.4 | 150 147 | 3 | 3,554 | 1.7 | 140 131 |
| 8.4 | 4 | 12,755 | 2.7 | 148 148 | | | | | | | | |
| Approximate level of sample fluorescence | 4,500 | | | | 9,000 | | | | 30,000 | | | |

*Consistent blank values unobtainable in solutions having no isocitrate.
Fluorescence values are in arbitrary instrument units.
N = number of samples in each test.
M = mean fluorescence change of group of samples in each test.
RSD% = relative standard deviation of mean fluorescence change, expressed as percent of change.
F = analytical factor, calculated as slope of line for change of fluorescence per nanomol of isocitrate, $\times 10^{-1}$; this is calculated for the increase from the next lower concentration, and where second number appears, for the increase from the second lower concentration.

It is necessary to use a method of standard addition of isocitrate for standardization of this analysis, because consistent and meaningful values for fluorescence change cannot be obtained in solutions with no isocitrate in them. Also, the standardization factor for change of fluorescence per nanomol is of isocitrate is different between blank solutions containing no tissue extract or Florisil treated extract, and tissue sample containing a much higher background fluorescence with light absorbing or scattering material.

EXAMPLE 4

A test of the temperature stability of the instrument was carried out, using fluorescent glass with a temperature coefficient of fluorescence of about 2 percent per °C. This test also gave a good estimate of the overall instrument precision and stability. A fluorescent glass block was inserted in one position in the sample carrier and another in the reference position. The carrier was rotated automatically and fluorescence readings of the sample recorded every 160 seconds, for a series of 31 readings. The first six measurements, over 16 minutes, showed drift in fluorescence due to the temperature stabilization transient. The next 25 readings, over a one-hour period, showed no perceptible drift and had a relative standard deviation of $8 \times 10^{-5}$.

This precision of a single fluorescence reading is equivalent to a relative standard deviation of $1.1 \times 10^{-2}$, or a precision of about 1 percent, for the measurement of a fluorescence difference of 1 percent between two readings. Experimental values for the precision of fluorescence change observed with biochemical samples were of the order of a few percent. This shows clearly that there are factors other than instrument precision per se involved in practical measurements of real samples, and emphasizes that great care must be taken with the preparative aspects of an analysis if one is to take advantage of this new instrument.

DISCUSSION OF RESULTS

Quinine and Pyruvate Samples

The level of fluorescence in these tests was chosen to be similar to the tissue extracts for which the instrument is intended. The precision with quinine samples was about the same, 4.2 percent to 6.5 percent, in each of the tests, independent of the change in fluorescence, over more than a ten-fold range of fluorescence change (0.44 percent to 7.5 percent). The exception is test Q2, where the precision was inexplicably poor. With the quinine tests, the precision shown is expected to be determined solely by instrumental factors.

In the case of pyruvate reaction, the precision was poorer than with quinine at the 1 percent level of change but better with larger changes, as would be expected. The 1 percent change level probably represents the lower limit at which useful analytical results can be obtained without excessively poor precision.

Bubbles in the sample cells can be a serious source of variation and form when the cells are allowed to remain in the fluorometer too long before making a measurement. This was discovered to be the cause of poor precision in Test P2, and may be the explanation of the results of Test Q2.

Isocitrate Samples

Referring to Table 2, the precision in these tests, for each group of samples, was between 0.5 percent and 3.9 percent relative standard deviation, with one exception, and tended to be about 3 percent. The exception, 7 percent, was in the case of a blank solution with 0.084 nanomols of isocitrate added. This supports the observation that some minimum level of isocitrate must be present to provide a consistent reaction, since the fluorescence change values for blank solutions containing no isocitrate were very erratic. Also, the addition of 0.084 nanomols of isocitrate to the liver-containing sample groups did not produce a fluorescence change which was consistent between the two groups and with the other data, even through the precision was good.

With higher levels of isocitrate added, 0.84 and 8.4 nanomols per sample, the blank solutions and the liver samples (which contain endogenous isocitrate) showed good precision and a selfconsistent analytical factor for fluorescence change per namomol of isocitrate. Each type of sample has a somewhat different factor, which is why internal standarization by the method of standard addition is required. Calculation shows that the treated liver contained 1.3 nanomols per sample, and the untreated liver 1.8 nanomols per sample of 0.2 ml of homogenate. The analysis of liver for endogenous isocitrate at this level can be conducted with a precision of a few percent.

Attempts to analyse at lower concentration of substrate, using glyceraldehyde phosphate, were unsuccessful because of inconsistent analytical reactions in liver samples. Solutions without liver, containing 0.4 nanomols of substrate, behaved rationally. Certainly the instrument is capable of precisely measuring substrate at a level lower than that demonstrated, procided that noninstrumental anomalies do not interfere. In general, the technique described here extends the capability for making such measurements by a factor of about ten, compared with conventional fluorometers, and offers the convenience of automated operation as a bonus.

It should be apparent from the foregoing detailed description that the objects set forth hereinabove have been successfully achieved. Moreover, while there is shown and described a present preferred embodiment of the invention, it is to be distinctly understood that the invention is not limited thereto but may be otherwise variously embodied and practiced within the scope of the following claims.

Accordingly, what is claimed is:

1. A high precision fluorometer for biochemical measurements comprising:

A. a source of a beam of radiant energy;

B. cell means for holding a sample to be measured, said sample being of a type exhibiting an initial level of fluorescence when irradiated by said radiant energy;

c. means for dispensing a reagent into said sample cell means to thereby change the fluorescence level of said sample relative to said initial level;

D. reference cell means;

E. said sample cell means and said reference cell means having at least two adjacent faces at right angles to each other, said beam entering through one of said adjacent faces and fluorescence energy exiting through the other of said adjacent faces;

F. photomultiplier means for converting fluorescent energy into electrical signals;

G. a movably mounted mirror means for selectively directing said beam at said sample cell means or said reference cell means, whereby said sample or said reference, respectively, will be excited by said radiant energy to fluorescence, and simultaneously directing fluorescent energy from said sample cell means or said reference cell means, respectively, toward said photomultiplier means;

H. means for converting said electrical signals to digital signals;

I. means for integrating said digital signals over a predetermined time interval;

J. means for comparing the signals from said sample cell with the signals from said reference cell, thereby producing the ratio of sample to reference intensity;

K. print-out means;

L. rotatable carrier means for a plurality of sample cells, said carrier means being a circular metal block containing channel means for circulation of water at a constant temperature to thereby control the temperature of said cells;

M. means for rotating said carrier means to position individual cells for dispensing said reagents thereinto and excitation by said beam; and N. control means for selectively rotating said carrier means and directing said beams and activating said means for integrating said digital signals, comparing said sample and reference signals, and printing out the desired information.

2. The device of claim 1, wherein said radiant energy comprises wavelengths below about 400 nm.

3. The device of claim 1, further comprising primary filter means which passes wavelengths below about 400 nm, interposed between said source of radiant energy and said means for directing said beam, and secondary filter means which blocks wavelengths below about 400 nm interposed between said means for directing fluorescent energy and said photomultiplier means.

4. A method for high precision biochemical analysis comprising:
A. providing a source of a beam of radiant energy;
B. providing a movable mirror means for selectively directing said beam toward a first position and a second position, respectively when irradiated by said radiant energy;
C. providing a sample of a type exhibiting an initial level of fluorescence to be measured at said first position;
D. providing a reference in said second position;
E. providing photomultiplier means for converting fluorescent energy into electrical signals;
F. said movable mirror means also simultaneously directing fluorescent energy from said sample of said reference, respectively, toward said photomultiplier means;
G. selectively directing said beam toward said first position or said second position, respectively, while simultaneously directing fluorescent energy from said sample or reference, respectively, toward said photomultiplier means;
H. converting said electrical signals to digital signals;
I. integrating said digital signals over a predetermined time interval;
J. comparing the signals from said sample with the signals from said reference, thereby producing the ratio of sample to reference intensity;
K. dispensing reagent into said sample to thereby change the fluorescence level of said sample relative to said initial fluorescence level;
L. repeating steps (G) through (J); and
M. printing out the desired information.

* * * * *